United States Patent
Guillaume et al.

(10) Patent No.: US 10,034,170 B2
(45) Date of Patent: Jul. 24, 2018

(54) METHOD AND DEVICE FOR COUPLING TWO COMMUNICATION PARTNERS

(71) Applicant: Robert Bosch GmbH, Stuttgart (DE)

(72) Inventors: Rene Guillaume, Weil der Stadt (DE); Paulius Duplys, Markgroeningen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 93 days.

(21) Appl. No.: 14/739,120

(22) Filed: Jun. 15, 2015

(65) Prior Publication Data
US 2015/0382185 A1    Dec. 31, 2015

(30) Foreign Application Priority Data
Jun. 25, 2014  (DE) .......................... 10 2014 212 226

(51) Int. Cl.
*H04W 12/08*    (2009.01)
*H04W 12/06*    (2009.01)
*H04L 29/06*    (2006.01)

(52) U.S. Cl.
CPC .......... *H04W 12/06* (2013.01); *H04L 63/107* (2013.01)

(58) Field of Classification Search
None
See application file for complete search history.

(56) References Cited

U.S. PATENT DOCUMENTS

| | | | | |
|---|---|---|---|---|
| 8,862,129 | B2* | 10/2014 | Moshir | .................. G06F 21/35 340/539.11 |
| 2007/0258508 | A1* | 11/2007 | Werb | .................... H04W 84/18 375/140 |
| 2009/0221316 | A1* | 9/2009 | Chuang | ................. G01S 5/0252 455/522 |
| 2014/0038540 | A1* | 2/2014 | Yang | .................... G01S 5/0252 455/226.1 |
| 2015/0256401 | A1* | 9/2015 | Zinger | ................... H04L 41/14 370/401 |

FOREIGN PATENT DOCUMENTS

WO    2013071999 A1    5/2013

* cited by examiner

*Primary Examiner* — Trang Doan
(74) *Attorney, Agent, or Firm* — Norton Rose Fulbright US LLP; Gerard Messina

(57) ABSTRACT

For coupling a first communication partner with a second communication partner, a signal source sends a radio signal to the first communication partner via a first channel. The first communication partner ascertains a first measured value of a measuring variable related to the first channel during the receiving of the radio signal, ascertains a first comparative value as a function of the first measured value, and sends the first comparative value to the second communication partner. The second communication partner ascertains a first relationship measure between the first comparative value and a second comparative value, and couples with the first communication partner if the first relationship measure exceeds a specified threshold value.

18 Claims, 1 Drawing Sheet

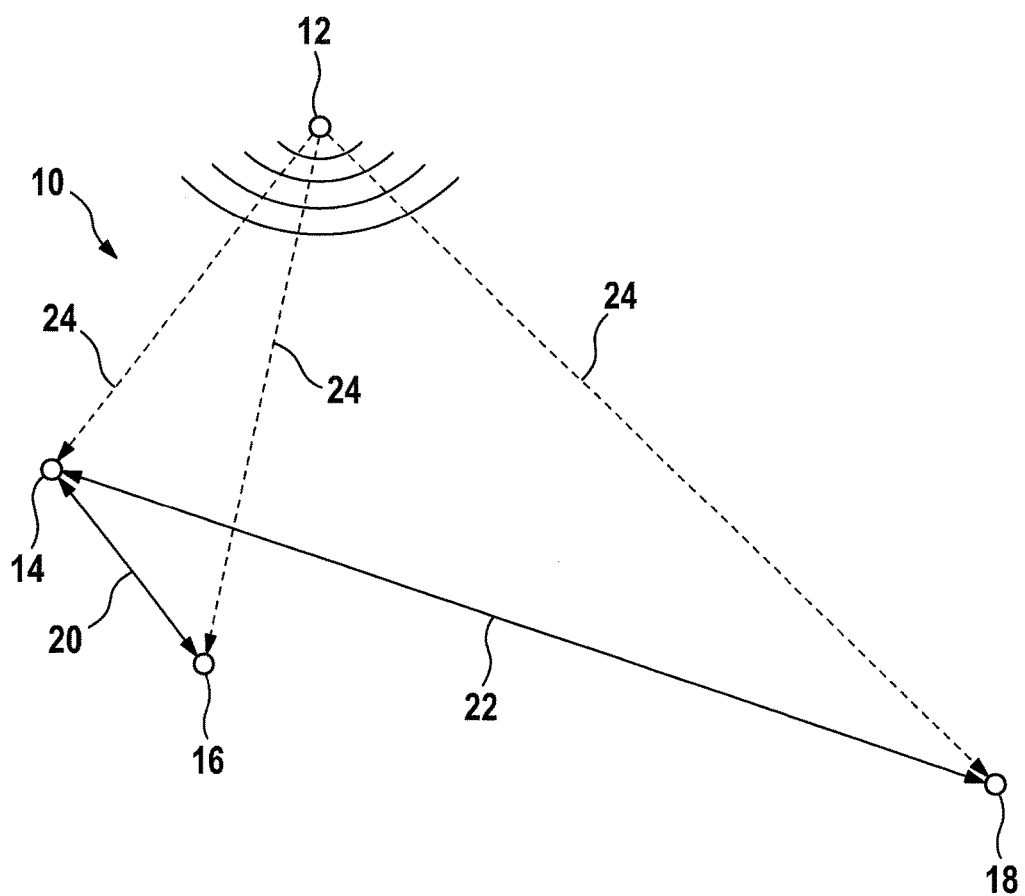

METHOD AND DEVICE FOR COUPLING TWO COMMUNICATION PARTNERS

BACKGROUND

Technical methods and systems in living rooms and homes, which are intended to make possible an increase in the quality of living accommodations and quality of life, security or energy efficiency using networked and remotely controllable devices and installations as well as automatable operations, are increasingly combined in building services automation under the generic term "smart home." The aforementioned concept thus includes both the networking of home technology and household devices, such as lamps, blinds, heating, cooking stove, refrigerator and washing machine, as well as the networking of components of entertainment electronics, for instance by central storage and home-wide utilization of video and audio contents. A smart home, in this sense, exists particularly if all the lighting fittings, push-button switches and devices used in the home are networked with each other.

A challenge, in this connection, is the secure communication between the mutually networked units. In this respect, the objective is to extend the smart-home infrastructure by including additional communication partners, without weakening the security of the network in such a way that unauthorized persons could also obtain access to the units connected.

To attain this objective, WO 2013071999 A1 provides a method which includes the steps of providing a data carrier, which is assigned to the smart-home unit, and on which setup data for integrating the smart-home unit into the smart-home system are stored; reading out the setup data stored on the data carrier by the central control unit of the smart-home system; and developing a communication channel between the smart-home unit and the central control unit, based on the setup data.

Such methods, which are based on an approach known in cryptology as Pre-Shared Key (PSK), are not very suitable for everyday use in the application by the end user, who is technically not necessarily well versed. Just the archiving of the utilized data carrier or password does not satisfy the requirements of the target group with respect to an uncomplicated device and extension of the smart home.

SUMMARY

The present invention relates to a method for communicative coupling of components, a device configured to perform the method, a computer program executable for performing the method, and a machine-readable storage medium including such a program.

An advantage of the example embodiments of the present invention is improved user-friendliness. In an example embodiment, the method is based on that adjacent communication partners, because of a multipath reception via a wireless medium, are normally subject to similar fading phenomena when receiving a channel emitted by a common signal source, particularly a fading channel. The present invention utilizes the interrelationship of these fading phenomena in order to authenticate a further communication partner that is to be coupled based only on the partner's bodily distance from a trustworthy existing communication partner. The adjacent spatial position of the communication partners, for instance, in the context of the smart home, thus itself becomes a "shared secret," so that, in particular, attackers located outside the building are effectively excluded from an intended coupling.

In an example embodiment, a first communication partner ascertains a third comparative value as a function of a first measured value, a second communication partner ascertains a fourth comparative value as a function of a second measured value, the second communication partner sends the fourth comparative value to the first communication partner, and the first communication partner receives the fourth comparative value from the second communication partner, ascertains a second relationship measure between the third comparative value and the fourth comparative value, and couples with the second communication partner if the second relationship measure exceeds a threshold value. This approach can be applied to a typical scenario of two equally entitled coupling partners in the presence of a public signal source.

In an example embodiment, the signal source sends the radio signal via a second channel additionally to the second communication partner and the second communication partner receives the radio signal via the second channel from the signal source, and, during this time, ascertains a second measured value of a measuring variable related to the second channel as well as the second comparative value as a function of the second measured value. This example embodiment refines this method to a mutual exchange of mutually complementing key parts, which results in a particularly simple and resource-conserving implementation if the first comparative value is a first number subsequence of a polyadic number representation of the first measured value, the second comparative value is a second number subsequence of the number representation of the second measured value corresponding to the first number subsequence according to place value, the third comparative value is a third number subsequence of the number representation of the first measured value that is complementary to the first number subsequence and the fourth comparative value is a fourth number subsequence of the number representation of the fourth measured value corresponding to the third number subsequence according to place value.

In an alternative example embodiment, a common base station includes the signal source and the second communication partner, the signal source sends the radio signal via a second channel further to a third communication partner, the third communication partner, when receiving the radio signal, ascertains a second measured value of a measuring variable related to the second channel, the third communication partner sends the second measured value to the second communication partner and the second communication partner receives the second measured value from the third communication partner, the first comparative value being the first measured value and the second comparative value being the second measured value. This embodiment applies the basic idea of the present invention to an advantageous scenario for the smart home field, in which a trustworthy unit, for instance, a smart phone or a tablet PC, is used for coupling a new communication partner with a base station that is accessible to both units.

A further security improvement is opened up by the optional encrypting of the communication, in that the first communication partner and the second communication partner ascertain a shared key as a function of a physical property of a channel connecting them, and encrypt the values to be sent, prior to sending, using the key and decrypt the received values, after receiving them, using the key. Various types of attacks are thus effectively forestalled, already in the coupling phase.

In an example embodiment, the relationship measure is Pearson's correlation coefficient. The measure is easy to calculate, has been researched extensively in statistics, and provides a degree of the linear relationship between the fading phenomena observed by the two communication partners.

An exemplary embodiment of the present invention is shown in the drawing, and described in detail in the following.

BRIEF DESCRIPTION OF THE DRAWING

The FIGURE shows a sequence according to an example embodiment of the present invention.

DETAILED DESCRIPTION

The FIGURE schematically illustrates the sequence of a method, according to an example embodiment of the present invention, for coupling a first communication partner 16 with a second communication partner 14 that has already been classified as being trustworthy, within the scope of a wireless connecting network 10. First communication partner 16 and second communication partner 14 are both connected to a signal source 12, which emits a radio signal 24 that is essentially nondirectional.

As is easily seen from the topology according to the illustration, the first communication partner 16 to be coupled is located at only a slight distance 20 from second communication partner 14. From the perspective of second communication partner 14, the spatial closeness of first communication partner 16 distinguishes first communication partner 16 from a conceivable attacker 18 located at a substantially greater distance 22 from second communication partner 14.

At the beginning of the method, first communication partner 16 and second communication partner 14 first ascertain a shared key as a function of a physical property of a channel connecting them. The key, thus ascertained, puts first communication partner 16 and second communication partner 14 in a position to protect every single further exchange, using a suitable, symmetrical encrypting method, without, ahead of time, divulging significant parts of the key to be ascertained over the unsecured channel itself.

Subsequently, first communication partner 16 receives radio signal 24 from signal source 12. The dissipative nature of the wireless transmission of radio signal 24 suggests interpreting the communication channel between signal source 12 and first communication partner 16 as a (first) channel, since the received field strength on the part of first communication partner 16 is subject to fluctuations because of interference, shielding, multipath spreading out as well as those caused by Doppler Effects.

In order to utilize the characteristic form of these fading phenomena, according to the present invention, during the receiving of radio signal 24, first communication partner 16 measures a first measured value of a measuring variable related to the first channel. In the present specific embodiment, an indicator for the received field strength of cableless communication applications is drawn upon as the measuring variable, which is known to one skilled in the art as received signal strength indicator (RSSI). It is understood that an alternative example embodiment of the method can nevertheless use a different measuring variable, without leaving the scope of the present invention.

Second communication partner 14 proceeds in a manner corresponding to first communication partner 16. Thus, second communication partner 14 receives the radio signal over a second channel, that is not dissimilar to the first channel, second communication partner 14, on its part, measuring a second measured value of the measuring variable that is now related to the second channel.

After the measurement of this first measured value, first communication partner 16 ascertains a first comparative value as a function of the first measured value, which, in the present example, corresponds to a first number subsequence of a polyadic number representation of the first measured value, for instance, any one-half of this representation. Meanwhile, second communication partner 14 ascertains a second number subsequence of the number representation of the second measured value, corresponding to the first number subsequence according to place value. Together with a complementary third number subsequence of the number representation of the first measured value and a fourth number subsequence, corresponding to this third number subsequence, of the number representation of the second measured value, a subdivision of the measured values is thus obtained, in which the first and third number subsequences ascertained by the first communication partner 16 supplement each other for the number representation of the first measured value, and the second and fourth number subsequences, ascertained by second communication partner 14, on the other hand, supplement each other for the number representation of the second measured value. The second, third and fourth number subsequence will from here on be referred to as second, third or fourth comparative value.

First communication partner 16 now encrypts the first comparative value with the shared key and sends it to the second communication partner 14, which receives it immediately and decrypts it in the opposite manner. In a corresponding manner, in the opposite direction, the fourth comparative value is transmitted encrypted by second communication partner 14 to first communication partner 16, so that the two communication partners 14, 16, as it were, possess a part of a measured value measured respectively by the other communication partner 16, 14.

On this basis, second communication partner 14 ascertains a first relationship measure between the first comparative value and the second comparative value, ascertained by the second communication partner 1 and which corresponds to the first comparative value as to place value. As the relationship measure, in the case at hand, one would focus on Pearson's correlation coefficient, one skilled in the art again being able to choose from a plurality of possible modifications. First communication partner 16, on its part, ascertains a second relationship measure between the third comparative value, ascertained by first communication partner 16, and the fourth comparative value which corresponds to the third comparative value as to place value.

Thus, all decision-relevant data are available to both communication partners 14, 16, a high relationship measure, according to what was said above, being indicative of a small spatial distance of communication partners 14, 16 from each other. A mutual coupling of communication partners 14, 16 is therefore only carried out if the relationship measure respectively ascertained exceeds a specified threshold value.

According to a second example embodiment of the method according to the present invention (not shown separately in the drawing), the first communication partner is coupled with a second communication partner, in the form of a given base station, only if the first communication partner is located in the immediate vicinity of a third communication partner 14 that has been classified as being trustworthy.

In this scenario, the base station functioning as the second communication partner acts at the same time as a signal source. At the beginning of the method, the first communication partner and the base station first ascertain a shared key as a function of a physical property of the first channel connecting them. The key, thus ascertained, puts the first communication partner and the base station, as in the case of the first specific embodiment, in a position to protect every single further exchange, using a suitable, symmetrical encrypting method, without, ahead of time, divulging significant parts of the key to be ascertained over the unsecured channel itself. In the same way, the base station and the third communication partner act so that these parties too are henceforth able to communicate in an encrypted manner.

Subsequently, the first communication partner receives the radio signal from the base station via the first channel connecting them. Once again, the first communication partner, during reception of the radio signal, measures a first measured value of a measuring variable related to the first channel. The third communication partner receives the same radio signal via a second channel, that is not dissimilar from the first channel, the third communication partner, on its part, measuring a second measured value of the measuring variable that is now related to the second channel.

After the measurement from both sides, there follows a transmission of the first measured value by the first communication partner to the base station and of the second measured value by the third communication partner to the base station, the previously mentioned symmetrical encryption being used in the process.

As the first comparative value, in this case, the first measured value can be used directly, and as the second comparative value, the second measured value. The steps additionally executed in the first specific embodiment, of subdividing and fitting together the number representations of the measured values, therefore become superfluous according to the present embodiment.

The presence of both measured values thus enables the base station to determine directly the relationship measure between these values, and to couple with the first communication partner only when this relationship measure exceeds the specified threshold value.

What is claimed is:

1. A method for coupling a first communication device to a second communication device, the method comprising:
   receiving, by the first communication device, a radio signal from a signal source via a first channel;
   measuring, by the first communication device, a first signal strength of the radio signal based on the reception of the radio signal;
   ascertaining, by the first communication device, a first comparative value; the first comparative value representing the first measured signal strength; and
   sending, by the first communication device, the first comparative value to the second communication device;
   ascertaining, by the second communication device, a first relationship measure between the first comparative value sent by the first communication device and a second comparative value, the second comparative value representing a second signal strength of the radio signal, the second signal strength being a signal strength of the radio signal as received over a second channel, the first relationship measure being a correlation, the second channel being different from the first channel;
   determining whether the relationship measure exceeds a predefined threshold value;
   coupling the second communication device with the first communication device via a communication channel based on the determination; and
   communicating data between the second communication device and the first communication device over the communication channel after the coupling.

2. The method of claim 1, wherein the second communication device measures the second signal strength of the radio signal based on reception of the radio signal from the signal source over the second channel, the second comparative value representing the second measured signal strength.

3. The method of claim 2, further comprising:
   ascertaining, by the first communication device, a third comparative value, the third comparative value representing the first measured signal strength;
   receiving, by the first communication device, a fourth comparative value from the second communication device, wherein the fourth comparative value represents the second measured signal strength;
   ascertaining, by the first communication device, a second relationship measure between the third comparative value and the fourth comparative value; and
   coupling the first communication device with the second communication device responsive to the second relationship measure exceeding the threshold value.

4. The method of claim 1, further comprising:
   ascertaining, by the first communication device, a key as a function of a physical property of the communication channel connecting the first and second communication devices, wherein the second communication device is configured to also ascertain the key as the function of the physical property of the channel connecting the first and second communication devices;
   encrypting, by the first communication device, the first comparative value prior to sending it to the second communication device; and
   using the key to decrypt an encrypted value received from the second communication device, wherein the second communication device is configured to use the key to decrypt the first comparative value from the first communication device.

5. The method of claim 1, wherein the first relationship measure is determined by ascertaining a Pearson's correlation coefficient.

6. The method of claim 1, wherein:
   the second communication device is the signal source, and sends the radio signal via the second channel to a third communication device; and
   the third communication device, based on its reception of the radio signal, ascertains the second comparative value representing the second measured signal strength of the radio signal received via the second channel, and sends the second comparative value to the second communication device.

7. The method of claim 1, wherein the signal source is separate from both the first communication device and the second communication device, and the second communication device is configured to receive the radio signal from the signal source via the second channel, and to measure the second signal strength based on the reception of the radio signal via the second channel.

8. A first communication device comprising:
a receiver configured to receive a radio signal from a signal source via a first channel;
processing circuitry configured to, based on the reception of the radio signal, measure a first signal strength of the radio signal and ascertain a first comparative value, the first comparative value representing the first measured signal strength; and
a transmitter configured to send the first comparative value to a second communication device,
wherein the second communication device is configured to:
ascertain a relationship measure between the first comparative value sent by the first communication device and a second comparative value, the second comparative value representing a second signal strength of the radio signal, the second signal strength being a signal strength of the radio signal as received over a second channel, the relationship measure being a correlation, the second channel being different from the first channel, and
couple the second communication device with the first communication device, via a communication channel, if the first relationship measure exceeds a predefined threshold value; and
wherein the first and second communication device communicate data between each other over the communication channel after the coupling.

9. The first communication device according to claim 8, wherein the second communication device is configured to ascertain the relationship measure by determining a Pearson's correlation coefficient.

10. The first communication device of claim 8, wherein the signal source is separate from both the first communication device and the second communication device, and the second communication device is configured to receive the radio signal from the signal source via the second channel, and to measure the second signal strength based on the reception of the radio signal via the second channel.

11. A non-transitory computer-readable medium on which are stored instructions that are executable by a computer processor of a first communication device and that, when executed by the processor, cause the processor to perform a method for coupling the first communication device to a second communication device, the method comprising:
based on reception of a radio signal from a signal source via a first channel, ascertaining a first comparative value, the first comparative value representing as a function of a first measured signal strength of the radio signal received via the first channel; and
sending the first comparative value to the second communication device,
wherein the second communication device is configured to:
ascertain a relationship measure between the first comparative value sent by the first communication device and a second comparative value, the second comparative value representing a second signal strength of the radio signal, the second signal strength being a signal strength of the radio signal as received over a second channel, the relationship measure being a correlation, the second channel being different from the first channel, and
couple the second communication device with the first communication device, via a communication channel, if the first relationship measure exceeds a predefined threshold value;
wherein the first and second communication device communicate data between each other over the communication channel after the coupling.

12. The non-transitory computer-readable medium according to claim 11, wherein the second communication device is configured to ascertain the relationship measure by determining a Pearson's correlation coefficient.

13. A method for coupling a first communication device with a second communication device, the method comprising:
receiving, by the second communication device, a radio signal from a signal source via a first channel;
during the reception of the radio signal via the first channel, measuring, by the second communication device, a signal strength of the radio signal;
ascertaining, by the second communication device, a first comparative value, the first comparative value representing the measured signal strength;
receiving, by the second communication device, a second comparative value from the first communication device;
ascertaining, by the second communication device, a relationship measure between the first comparative value and the second comparative value, the relationship measure being a correlation;
determining whether the relationship measure exceeds a predefined threshold value;
coupling the second communication device with the first communication device based on the determination; and
communicating data between the second communication device and the first communication device over the communication channel after the coupling.

14. The method as recited in claim 13, wherein first communication device determines the second comparative value by:
receiving the radio signal via a second channel;
during the reception of the radio signal via the second channel, measuring a second signal strength of the radio signal; and
ascertaining the second comparative value, the second comparative value representing the measured second signal strength.

15. The method as recited in claim 13, wherein the relationship measure is indicative of a spatial distance between the first communication device and the second communication device.

16. The method according to claim 13, wherein the ascertaining the relationship measure includes determining a Pearson's correlation coefficient.

17. A method for coupling a first communication device with a second communication device, the method comprising:
transmitting, by the second communication device, a radio signal;
receiving, from a first communication device, a first comparative value, the first comparative value being a function of a first measured signal strength of the radio signal received by the first communication device via a first channel;
receiving, by the second communication device from a trusted communication device, a second comparative value, the second comparative value being a function of a second measured signal strength of the radio signal received by the trusted communication device via a second channel;
ascertaining, by the second communication device, a relationship measure between the first comparative value and the second comparative value, the relationship measure being a correlation;

determining whether the relationship measure exceeds a predefined threshold value;

coupling the second communication device with the first communication device via a communication channel, based on the determination; and communicating data between the second communication device and the first communication device over the communication channel after the coupling.

18. The method according to claim 17, wherein the ascertaining the relationship measure includes determining a Pearson's correlation coefficient.

* * * * *